(No Model.)
B. C. SABIN.
KETTLE.
No. 593,127. Patented Nov. 2, 1897.
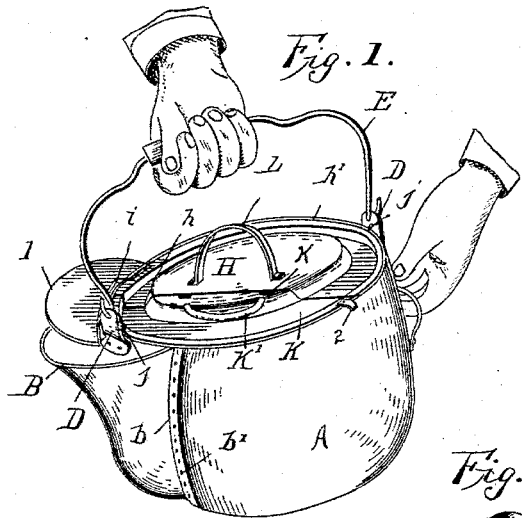
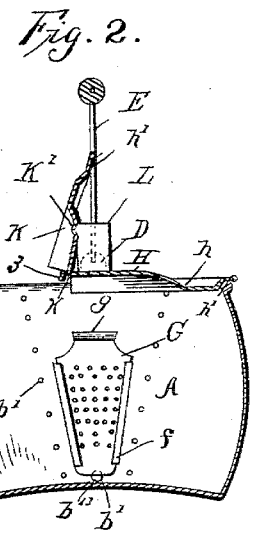
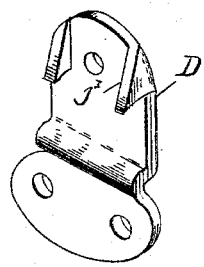
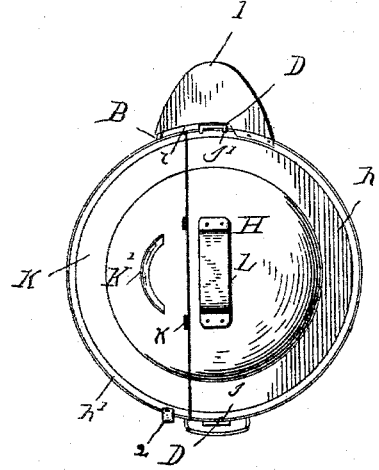
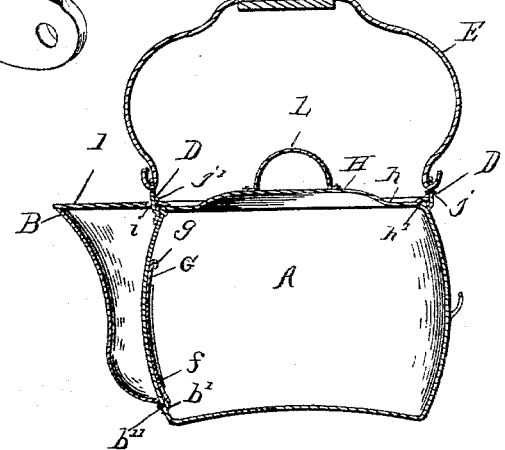
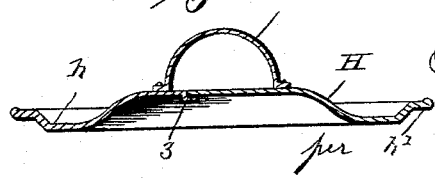
Witnesses
F. C. Barry
C. H. Duffy
Inventor
Belle C. Sabin
per O. E. Duffy
Attorney

UNITED STATES PATENT OFFICE.

BELLE C. SABIN, OF HARVEY, ILLINOIS.

KETTLE.

SPECIFICATION forming part of Letters Patent No. 593,127, dated November 2, 1897.

Application filed November 5, 1896. Serial No. 611,140. (No model.)

*To all whom it may concern:*

Be it known that I, BELLE C. SABIN, of Harvey, in the county of Cook and State of Illinois, have invented certain new and useful Improvements in Kettles; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

This invention relates to culinary vessels, especially kettles, and has for its object improvements in the detail of construction of such vessels whereby their efficiency is increased without materially increasing their cost.

With this object in view the invention consists in the improved construction, arrangement, and combination of parts hereinafter fully described, and afterward specifically pointed out in the claims.

In the accompanying drawings, Figure 1 represents a perspective view of a vessel constructed in accordance with my invention, the lid being slightly turned, partially uncovering the spout. Fig. 2 represents a cross-section through the vessel, the hinged section of the lid being open and resting against the handle of the lid. Fig. 3 represents a plan view of the vessel with the lid closed and the wire-bail handle of the vessel removed. Fig. 4 represents a longitudinal sectional view of the vessel, and Fig. 5 represents a perspective view of one of the bail-ears removed from the vessel.

Like letters and numerals of reference mark the same parts wherever they occur in the various figures of the drawings.

Referring to the drawings by letters and figures, A is the kettle or culinary vessel, which is provided with a spout B on one side and ears D on the upper edge, with which a bail-handle E is engaged in the usual manner.

The spout B is made separate from the body of the vessel and extends from the bottom to the top thereof, being larger at the top than at the bottom and having flanges $b$, through which rivets $b'$ pass to secure it to the body. Communication is had between the interior of the vessel and the spout through an opening in the side wall of the vessel, and the edges of the wall at the sides of the opening are bent to form flanges $f$, under which the side edges of a strainer-plate G slide, whereby the strainer is held in position. This opening and the strainer-plate are tapered on the sides converging toward the bottom, so that the strainer-plate may be readily inserted or removed. In order that the strainer-plate may be firmly held in position, the inner end or head of the rivet $b''$ (one of the rivets which secure the spout to the body) is projected slightly, so that the lower end of the strainer-plate will wedge over it, pressing the sides of the strainer-plate inward against the flanges $f$. Thus the rivet $b''$ serves the double function of assisting in securing the spout to the body and wedging the strainer-plate in position. The holes in the strainer-plate are of any suitable size, according to the use to be made of the vessel, and each vessel may be provided with a series of strainer-plates with holes of different sizes to accommodate the vessel to the various purposes for which such a vessel may be used, the plates being readily removable, the top being bent over to form a handle, as at $g$, Figs. 2 and 4.

The vessel is covered by a lid H, which is provided with a downwardly-projecting portion $h$ to fit in the upper portion of the vessel and the annular flange $h'$ to lie on the top or edge of the side walls of the vessel. This lid is formed with a lip projecting from one side thereof to cover the spout when the lid is in place. There is a slot $i$ left between the projecting lip I and the main body of the lid, which passes around one of the ears D when turning the lid into its closed position. The lid is firmly held on the vessel by inward projections on the ears, under which the annular flange $h'$ of the lid engages. I make these projections by using an inwardly-projecting rivet $j$ or by forming them in shape of teeth $j'$ integral with the bail-ears D, the ears being formed with such teeth by the process of stamping them during the course of manufacture. The lid is formed with a movable section K, united by hinges $k$ to the main body thereof, and the handle L, by which the lid is manipulated, is so placed with relation to this hinged section that it will act as a rest therefor when it is raised, a depression being stamped in the lid at K', which coincides with the handle when the hinged section rests against the handle, thus permitting the hinged section to pass beyond the perpendicular position and obviating the liability of its falling back to its closed position and dispensing with the necessity of holding it in its open position by the hand, as shown in Fig. 2. The hinged section of the lid is raised by means of lug 2, which projects from the edge of said hinged section. On the hinged section, just below the hinges, a right-angled flange is formed to fit against the rotative section when the hinged section is closed, and in this manner the joint necessarily formed between the sections thus preventing the escape of steam from the vessel through said joint.

It will be readily seen from the foregoing description that a vessel constructed in accordance with my invention may be used with safety in the cooking of all kinds of foods. With the lid in position to close the top of the vessel and spout the contents may be replenished by raising the hinged section of the lid. This is of special benefit in originally filling the vessel and introducing such liquids, meats, and vegetables as it may be desired to introduce from the top, and also for the tasting of vegetables and turning meats during the process of cooking, when otherwise it would be necessary to remove the entire cover. Should it be desired, any liquid may be introduced through the spout, so that it would enter the vessel at the bottom.

The strainer is firmly held in place, so that there is no liability of its misplacement in pouring out the contents, while at the same time it is readily removable at will.

The lid is firmly held in place by the projections on the ears, but may be readily rotated to cover or uncover the spout without getting out of the control of these fastenings.

The spout reaching from top to bottom, the contents of the vessel are poured from the bottom instead of the top, thus leaving all scum or grease in the vessel when the liquid contents have been removed.

The lid being firmly held in place the aroma of the food is prevented from escaping and the contents may be poured out boiling hot without any liability of burning the hands of the user.

In the operation of pouring it is only necessary to partially rotate the lid, as shown in Fig. 1, to wholly or partially uncover the spout, the body of the vessel remaining closed, the hinged section having been rotated to a position under one of the projections of the ears, and thus prevented from opening.

While I have described herein the best means now known to me for carrying out my invention, I do not confine myself to the exact construction herein shown and described, as it is obvious that various slight changes might be made without departing from the spirit and scope of my invention.

Having thus fully described my invention, what I claim as new, and wish to secure by Letters Patent of the United States, is—

1. In a culinary vessel having a side spout opening on a level with the top of the vessel, the combination with said vessel and spout a rotatable lid having a projecting lip to cover said spout and a hinged section, and bail-ears attached to the vessel and having inward projections to lock either the main body of the lid, or its hinged section, substantially as and for the purpose set forth.

2. In a culinary vessel having an opening in the side, and having communication with the vessel through said opening and one of the fastening-rivets projecting inward below said opening in combination with inner flanges at the side of said opening and a strainer-plate held by said flanges and wedging over said inner projecting rivet substantially as set forth.

3. In a culinary vessel having an opening in the side near the bottom, said opening covered by a spout, made separate from the body of the vessel, extending from the bottom to the top of said vessel and secured through flanges by rivets to the body of the vessel, and having communication with the vessel through said opening and one of the fastening-rivets projecting inward below said opening, and a strainer-plate held by said flanges and wedging over said inner projecting rivet, substantially as set forth.

In testimony that I claim the foregoing as my own I affix my signature in presence of two witnesses.

BELLE C. SABIN.

Witnesses:
   Mrs. N. M. CARPENTER,
   M. BLANCHE HULEATT.